Sept 10, 1957 W. B. LOCKE, SR 2,805,481
TOOL GAGE
Filed Dec. 22, 1955
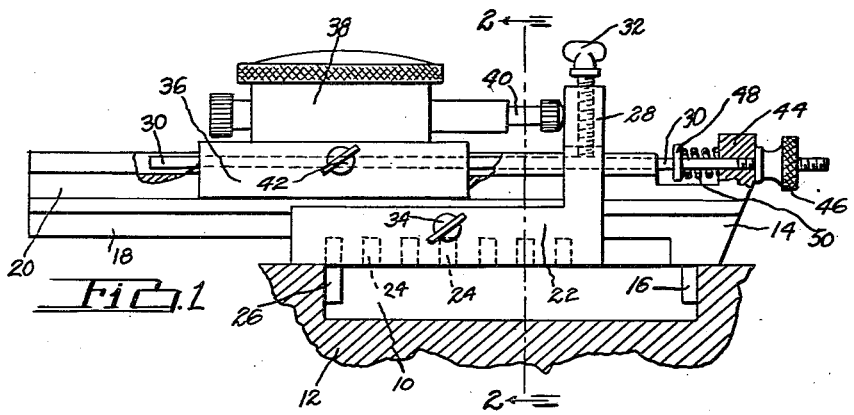
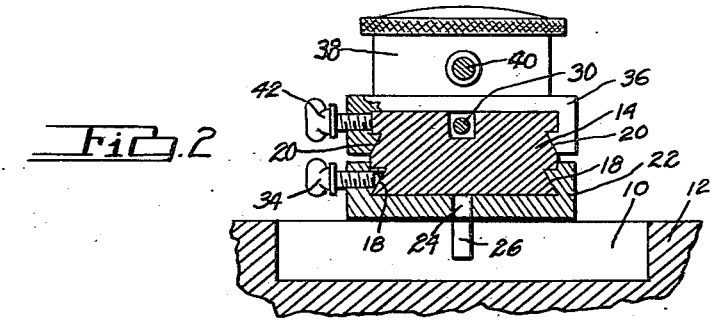
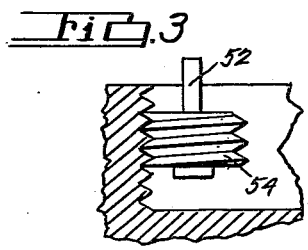
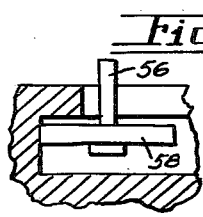
INVENTOR.
WILLIAM B. LOCKE SR.
BY
ATTORNEY

United States Patent Office 2,805,481
Patented Sept. 10, 1957

2,805,481

TOOL GAGE

William B. Locke, Sr., Highland Park, Mich.

Application December 22, 1955, Serial No. 554,738

1 Claim. (Cl. 33—143)

This invention relates to a gage for determining actual dimensions between distances in spaced openings or the diameter of a single opening, especially adapted for measuring distances in minute fractions of a unit of length. The gage is particularly adapted for measuring threaded openings or undercuts.

It is an object of the present invention to provide a rigid tool which will not flex transversely when in use and one which will permit a small amount of longitudinal resiliency in diminishing the predetermined maximum dimension.

Another object of the invention is to provide a rigid bar having a depending projection at one end thereof; to provide a longitudinally slidable member on said bar having a depending projection, co-operating with the depending projection on the bar, and having an upwardly extending projection above the plane of the bar; and to provide another longitudinal slidable member on said bar which carries a dial indicator, co-operating with the upwardly extending projection on said first named longitudinally slidable member.

A further object of the invention is to provide a yielding compression device between said bar and said first named longitudinally slidable member, and to provide locking means for both of said longitudinally slidable members on said bar.

Other objects and advantages of the invention will more fully appear from the following description taken in connection with the accompanying drawings, in which;

Fig. 1 is a side elevational view of the improved gage, parts being broken away and shown in cross section;

Fig. 2 is a cross sectional view taken on line 2—2 of Fig. 1;

Fig. 3 is a fragmentary view of a modified form of contact member which may be substituted for either or both of the depending projections shown in Fig. 1; and Fig. 4 is a fragmentary view of a further modified form of contact member which may be substituted for either or both of the depending projections shown in Fig. 1.

Referring to the drawings, I have illustrated the invention as embodied in a tool for checking the diameter of a shallow opening 10 in a part 12, but the tool may be used in checking the distance between a plurality of openings or various parts having linear dimensions which are to be held to precision dimension.

The tool comprises a rigid bar 14 having a downwardly extending projection 16 at one end thereof, formed as a round pin to a precision diameter. The opposite sides of the bar 14 are each provided with a pair of longitudinal slide ways 18 and 20, shown as V shaped grooves. A slide block 22, in the form of a channel shaped member fitted to the bottom surface and the opposite sides of the bar 14, is slidably mounted in the grooves 18. The bottom wall of the block 22 is provided with a plurality of longitudinally spaced apertures 24 for the reception, in any one, of a downwardly extending pin 26, which like the pin 16, is made to a precision diameter. An upwardly extending boss 28 is carried by the block 22 and receives a longitudinally extending rod 30, adjustably positioned thereto by a lock screw 32. There is also provided a lock screw 34 for fixedly positioning the block 22 to the bar 14, if desired.

Another inverted channel shaped slide block 36 is fitted to the top surface and the opposite sides of the bar 14 and is slidably mounted in the grooves 20 longitudinally of the bar 14. This block 36 carries a dial indicator 38 preferably graduated in minute units. The reciprocating actuator 40 of the indicator is directed to the boss 28 and co-operates therewith to indicate the distance of relative movement between the pins 16 and 26 when the slide block 22 is free to move on the bar 14; it being understood that the relative movement of the two parts 22 and 14 is very slight after a predetermined setting has been made. The block 36 is also provided with a lock screw 42 for fixedly positioning the block 36 to the bar 14 in predetermined longitudinal relation to the block 22.

The rod 30 extends through an upwardly extending flange 44 at the end of the bar 14 adjacent the pin 16 and a nut 46 screw threaded on the end of the rod 30 serves as an adjustable stop for limiting the longitudinal movement of the rod 30 relative to the bar 14. When the boss is fixed to the rod 30, by the lock screw 32, the adjustable nut 46 limits the relative movement of the slide block 22 with respect to the bar 14. Thus, the maximum dimension between the pins 12 and 26 can be accurately determined. To permit the pins 16 and 26 to have some degree of flexibility toward each other, there is provided on the rod 30, spaced from the flange 44, a fixed washer 48 and a compression spring 50, between the washer 48 and flange 44, which urges the nut 46 toward the flange 44. By such a construction the operator of the tool may foreshorten the distance between the pins 16 and 26 when applying the tool to the part to be checked. The spring 50 thereafter urges the pins 16 and 26 to their maximum separation, determined by the position of the nut 46.

The boss 28, by its contact with the outer end of the reciprocating actuator 40, moves the latter to indicate either plus or minus dimensions on the dial indicator 38. The slide block 36 is adjustable on the bar 14 for accurately positioning the outer end of the actuator with respect to the boss 28 when the nut 46 is slightly spaced from the flange 44. The adjustment is made to the desired dimension so that plus readings may be obtained when the nut 46 approaches the flange 44. The slide bar 22 is permitted to have a limited flexible movement on the bar 14 short of and beyond the desired dimension, but has a rigid stop by the nut 46 for dimensions slightly greater than the desired dimension.

When it is desired to check threaded surfaces, such as internally threaded or externally threaded surfaces, the pins 16 and 26 may be replaced by a pin 52 having a rotatable threaded member 54 thereon of a known diameter, as illustrated in Fig. 3. If it is desired to check an undercut surface, as illustrated in Fig. 4, the pins 16 and 26 may be replaced by a pin 56 having a roller 58 having a known diameter. The flexibility of the slide block 22 permits retraction of the pins so that the screw threaded member 54 and the roller 58 may be received past the overhang of the undercut by compression of the spring 50.

The invention has been illustrated and described in connection with a specific form thereof which best shows the arrangement of parts, but it is to be understood that permissible variations may be made in the size, shape and arrangement of parts, without departing from the spirit of the invention and it is my intention to include such reasonable changes as may be made within the scope and meaning of the appended claim.

I claim:

A tool gage comprising, a bar, a member projecting downwardly from said bar, a slide block movable longitudinally along said bar, an upwardly projecting boss carried by said slide block, a downwardly projecting member carried by said slide block in spaced longitudinal relation to said first named member and co-operating with said member for measuring distances therebetween, a second slide block carried by said bar and free for longitudinal sliding movement relative to said first named block, a flange on said bar, a rod having sliding movement through said flange and extending longitudinally of said bar and through said boss, a nut screw threaded to one end of said rod for positioning said rod in predetermined position relative to said bar by contact with the outer face of said flange, a washer fixed to said rod in spaced relation to said flange, a compression spring between said washer and said flange, and means carried by said boss for fixing said rod and said boss in predetermined longitudinal position.

References Cited in the file of this patent

UNITED STATES PATENTS

| | | |
|---|---|---|
| 2,524,256 | Greany | Oct. 3, 1950 |

FOREIGN PATENTS

| | | |
|---|---|---|
| 7,454 (1902) | Great Britain | Feb. 19, 1903 |
| 250,403 | Switzerland | June 16, 1948 |